United States Patent [19]

Shaw

[11] Patent Number: 5,507,249
[45] Date of Patent: Apr. 16, 1996

[54] ANTLESS HUMMINGBIRD FEEDER

[76] Inventor: Harry J. Shaw, 6 Peach Orchard Rd., Seaville, N.J. 08230

[21] Appl. No.: 380,419

[22] Filed: Jan. 30, 1995

[51] Int. Cl.⁶ .................................................. A01K 7/00
[52] U.S. Cl. .................................................. 119/72
[58] Field of Search ....................... 119/72, 77, 52.3, 119/52.2, 52.4, 57.8, 57.9

[56]  References Cited

U.S. PATENT DOCUMENTS

| D. 252,288 | 7/1979 | Kilham ...................... D30/14 |
| D. 287,652 | 1/1987 | Mack ......................... D30/1 |
| D. 333,538 | 2/1993 | Kingsley ................... D30/199 |
| 3,125,069 | 3/1964 | Fowler ....................... 119/77 |
| 4,441,458 | 4/1984 | Mercil ...................... 119/57.9 |
| 4,691,665 | 9/1987 | Hefner ........................ 119/77 |
| 4,901,673 | 2/1990 | Overstreet ................... 119/72 |
| 5,247,904 | 9/1993 | Anderson ..................... 119/72 |
| 5,353,742 | 10/1994 | Mauritz ...................... 119/77 |

Primary Examiner—Thomas Price
Attorney, Agent, or Firm—David L. Baker; Rhodes & Ascolillo

[57]  ABSTRACT

The invention is a hummingbird feeder that is formed in three parts, a top including a cover and an ant inhibiting water filled moat; a globular reservoir that stores the nectar and a communication block and support for a plurality of feeding stations connected to a stem at the base of the globe. The three sections are threaded together and easily assembled and disassembled. The moat also serves as a water feeding station for small birds.

2 Claims, 3 Drawing Sheets

ANTLESS HUMMINGBIRD FEEDER

BACKGROUND OF THE INVENTION

1. Field of the Invention

This invention relates generally to hummingbird feeders and in particular to a feeder that provides a barrier to ants and other insects that tend to contaminate the nectar stored in the reservoir of the feeder.

2. Description of the Prior Art

People who are fortunate enough to live in an area inhabited by hummingbirds often encourage their presence by the use of hummingbird feeders. These feeders are distinct from the conventional feeder in that, rather than the usual dry food consumed by most birds, the hummingbird feeds on simulated nectar. The nectar is formed from water sweetened with sugar or honey. The nectar is normally stored in a reservoir and conveyed to simulated flowers where a perch is provided so that the hummingbird can land and, having a long slender beak, insert it into the access apertures in the simulated flower and feed. The nectar being sweet and unfortunately tends to attract ants and other insects. The ants tend to be aesthetically displeasing to the observer as well as contaminate the access apertures, consume the nectar and discourage the hummingbirds from using the feeder.

The feeder is conventionally suspended from a branch, building or specially constructed stand by a wire or string in order to allow the shy birds a good look at the feeder before approaching. The ants and insects find their way to the connection point and then follow the wire or string to the feeder and the feeder is soon covered with ants.

Various devices have been put forth in an attempt to inhibit ants and other crawling insects from reaching the nectar. The most common and well known device is the ant moat. This device in its various forms generally is suspended on the wire or string between the connecting point and the feeder, in some cases it forms part of the feeder. The moat is filled with water or oil and forms an effective barrier to the ants.

Examples of prior art hummingbird feeders are shown in U.S. Patents including U.S. Pat. No. 4,901,673 issued Feb. 20, 1990 to Overstreet who shows a feeder with a nectar reservoir including an area at the top for storing insect inhibiting oil. U.S. Pat. No. 5,247,904 issued Sep. 28, 1993 to Anderson discloses a hummingbird feeder including an area for storing a quantity of fluid around the main support post. U.S. Pat. No. Des. issued for hummingbird feeders include; U.S. Pat. No. Des. 252,288 issued Jul. 3, 1979 to Kilhar, U.S. Pat. No. Des. 287,652 issued Jan. 6, 1987 to Mack and U.S. Pat. No. Des. 333,538 issued Feb. 23, 1993 to Kingsley.

The prior fails to anticipate the hummingbird feeder as disclosed and claimed herein.

SUMMARY OF THE INVENTION

The invention is drawn to a hummingbird feeder that includes a storage vessel for nectar, a nectar dispensing system on one end and a cover, including a wet insect barrier on the other end. The feeder is suspended by a wire that engages the cover and is hooked to allow it to be conveniently suspended from a branch or other appropriate means. The invention is further characterized by the insect barrier which is of sufficient size and dimension to allow other small birds to perch and use the water in the barrier for drinking.

The invention is also characterized by simplicity, in that the feeder is formed of three major components that are threadedly assembled and may be quickly and easily separated for cleaning and filling.

The storage vessel is globular in shape having a threaded stem at the base which engages a dispensing station that would be of a design that would tend to encourage humming birds to feed. Many types of such designs are available and the specific one utilized has no effect on the overall operation of the invention. Opposed to the stem is an aperture for filling the storage vessel and includes an upstanding perimeter lip that is externally threaded. Attached to the lip by internal threads is a cover that seals the storage vessel. Mounted on top of the cover is an open container frustroconical in shape, with a suspension wire extending centrally from the bottom wall/cover for hanging the feeder.

It is therefore an object of the invention to provide a new and improved hummingbird feeder.

It is another object of the invention to provide a new and improved hummingbird feeder that is antless.

It is a further object of the invention to provide a new and improved hummingbird feeder that is an improvement over other known like feeders.

It is still another object of the invention to provide a new and improved hummingbird feeder that is easier to maintain than any known similar feeder.

It is still a further object of the invention to provide a new and improved hummingbird feeder that is less expensive to make and sell than other feeders of a like nature.

It is another object of the invention to provide a new and improved hummingbird feeder that is of sturdy construction and can be expected to provide satisfactory service for a long period of time.

These and other advantages, features and objects of the invention will become more apparent from the following description taken in connection with the illustrative embodiment in the accompanying drawings.

DETAILED DESCRIPTION OF A PREFERRED EMBODIMENT

Figure 1:
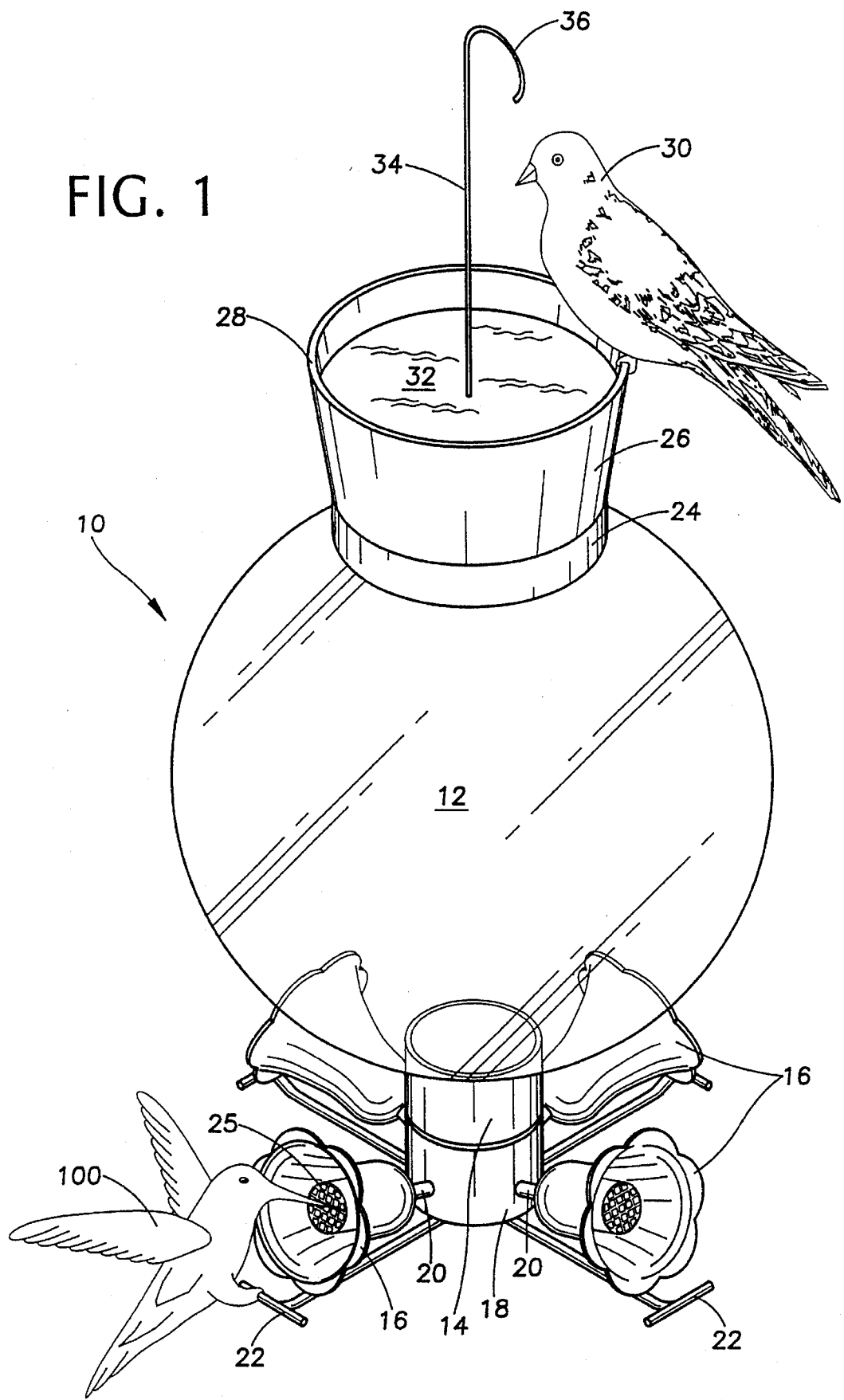
FIG. 1 is a environmental view of the invention in perspective.

Referring now to FIG. 1, the invention is shown generally at 10 and consists of a globular storage vessel 12 formed of plastic or other suitable material. A stem 14 extends from the base of the storage vessel and provides a support from which to suspend the nectar dispensing stations 16. The stations could be attached to a communicating block 18 and give the appearance of a flower attached by a tube 20. The flower could be further supported by a perch 22 that will allow the hummingbird 100 to land and feed from the simulated pistil 25 which communicates with the storage vessel. The vessel 12 is open at the side opposed to the base and closed by a cover 24 which includes a cup 26 with a wall 28 that forms a perch for other small birds 30 to land and drink water 32 stored in the cup. A wire 34 extends from the cup and contains a hook 36 for suspending the feeder. Water 32 in the cup prevents ants and other crawling insects from reaching the nectar in the dispensing stations 16.

Figure 2:
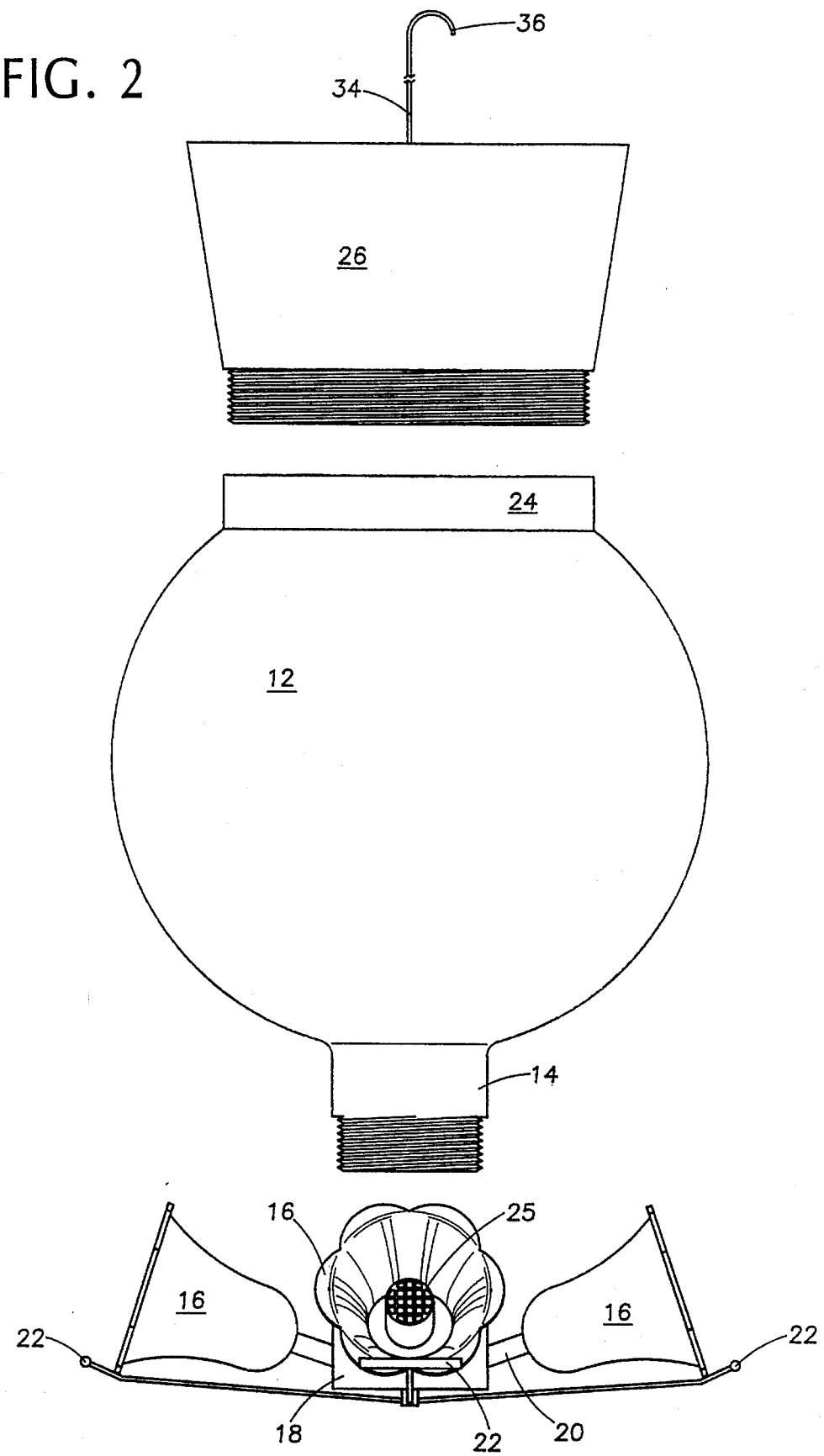
FIG. 2 is a side elevation view of the invention.

Concerning FIG. 2, the cover 24 is threaded to the circumferential lip 27 around the aperture 42 forming the filler opening to replenish the consumed nectar. Preferably the cover 24 is internally threaded and the lip is externally threaded but the converse would work equally as well. Likewise the communicating block 18 is threaded internally 40 to engage the external threads on the stem 14 of the vessel 12. The converse would work equally as well. The arrangement of the parts allows the feeder to be easily cleaned, refilled and stored.

Figure 3:
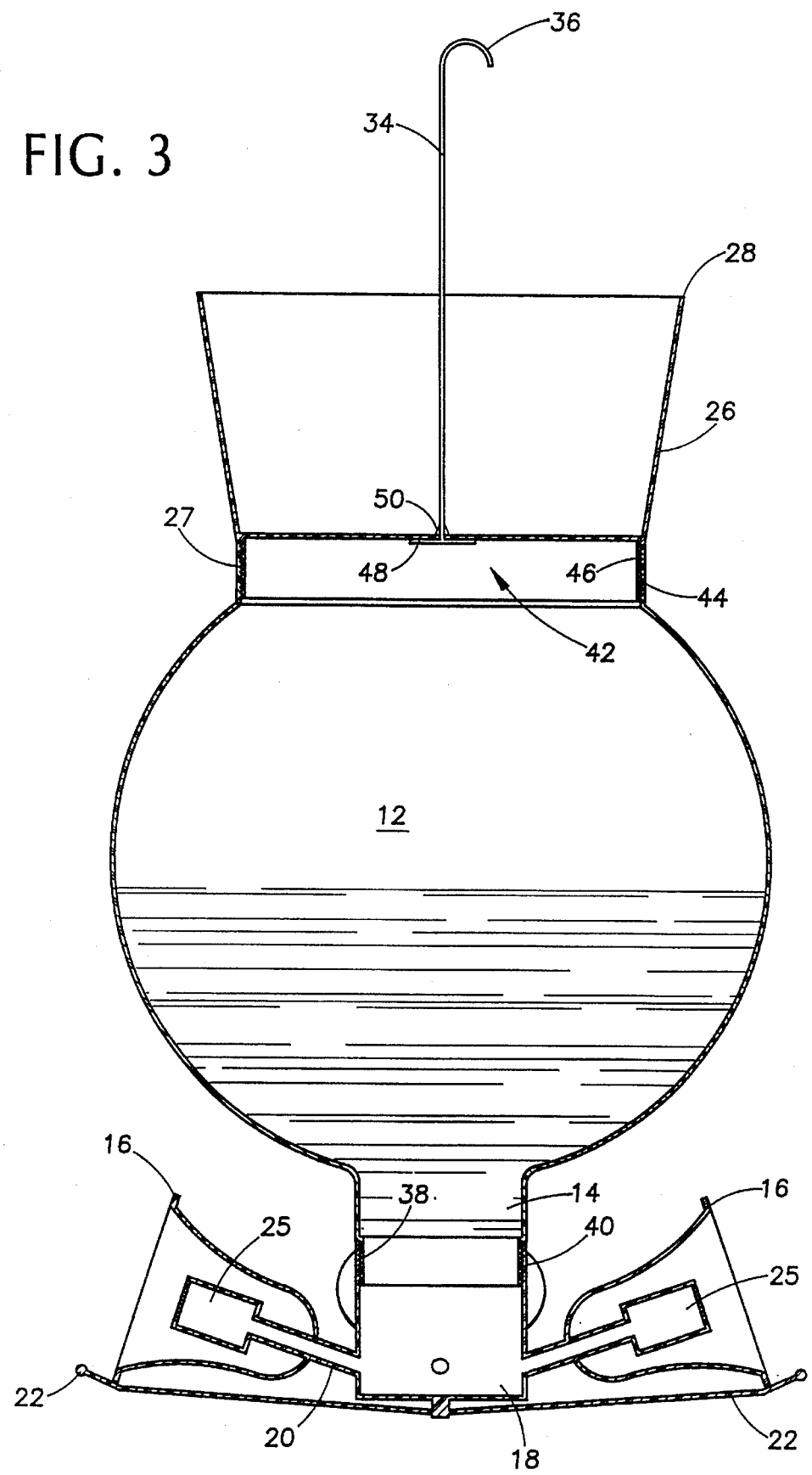
FIG. 3 is a cross sectional view of the invention.

FIG. 3 illustrates the invention in cross section, the storage vessel 12, with stem 14 and external threads 38 engaging communicating block 18 with internal threads 40. Nectar from the storage vessel passes to the pistil 25 from block 18 and tubes 20 which may be constructed to simulate a flower stem. The internal threads 44 of the cover 24 engage the external threads 46 of the vessel circumferential lip 27. The cover 24 also acts as the bottom of the cup 26 from which the wall 28 extends in a frustro-conical dimension. Extending from the cover through aperture 42 is the suspension wire 34 used to hang the feeder. A washer 48 is provided to distribute the weight of the feeder around the surface of the cover. An appropriate seal 50 is provided to prevent the contents of the cup from leaking into the storage vessel.

It should be understood, of course, that the foregoing discloser relates to only a preferred embodiment of the invention and that numerous modifications or alterations may be made therein without departing from the spirit and scope of the invention as set forth in the appended claims.

What is claimed is:

1. In an improved antless hummingbird feeder having a globular reservoir vessel for storing a supply of simulated nectar, a stem connected to the vessel supporting a plurality of feeding stations, including means for supplying nectar to the stations, a plurality of perches adjacent the feeding stations and an aperture in the reservoir for filling the reservoir; the improvement comprising:

a circumferential outwardly extending lip surrounding said aperture;

external threads formed in the outer surface of said lip;

a cover means for closing and aperture containing:
      internal threads engaging the external threads of said lip for closing the aperture; and
      a perimeter on the cover means; a liquid receiving cup comprising:
         a circular wall following the perimeter of the cover means and extending away therefrom;

a wire, extending centrally from the cover means and through the cup;

said wire having a hook placed on an end of the wire distal the cover means for suspending the feeder;

the cup contains water whereby ants are prevented from moving from the suspension wire to the cup wall and further to the feeding stations;

the cup wall forms a perch for small birds to drink from the said cup;

an externally threaded surface on the stem; and a communication block having:
      an internally threaded surface engaging the external threads of the stem;
      tube means for connecting the feeding stations to the communication block;
      a simulated pistil in each of said dispensing stations;
      a screen-like cover in the pistil to restrain passage of the liquid and to allow access to the liquid by a hummingbird.

2. An antless hummingbird feeder according to claim 1 wherein the feeder is formed of plastic.

* * * * *